United States Patent [19]

Okuda

[11] Patent Number: 5,828,181
[45] Date of Patent: Oct. 27, 1998

[54] DRIVING CIRCUIT FOR AN ORGANIC ELECTROLUMINESCENT ELEMENT USED IN A DISPLAY

[75] Inventor: Yoshiyuki Okuda, Tsurugashima, Japan

[73] Assignee: Pioneer Electronic Corporation, Tokyo, Japan

[21] Appl. No.: 653,160

[22] Filed: May 24, 1996

[30] Foreign Application Priority Data

May 29, 1995 [JP] Japan .................................. 7-153882

[51] Int. Cl.⁶ .............................. H05B 33/00; G09G 3/00; G09G 3/12
[52] U.S. Cl. .................................. 315/169.3; 315/200 R; 345/76; 345/77
[58] Field of Search .............................. 315/169.3, 169.1, 315/200 R; 345/211, 212, 82, 76, 77; 362/84, 800

[56] References Cited

U.S. PATENT DOCUMENTS

| | | | |
|---|---|---|---|
| 4,731,610 | 3/1988 | Baron et al. | 340/784 |
| 5,216,331 | 6/1993 | Hosokawa et al. | 315/169.3 |
| 5,552,678 | 9/1996 | Tang et al. | 315/169.3 |

*Primary Examiner*—Arnold Kinkead
*Attorney, Agent, or Firm*—Fish & Richardson P.C.

[57] ABSTRACT

An emitting element driving circuit for driving an organic emitting element comprises at least one emitting element, and a rectifier directly connected in series to the emitting element. The driving circuit for driving an emitting element having a capacitor in parallel to an emission part in its electrical equivalent circuit capable of achieving a sufficient luminance even at a low voltage of the power supply during a high speed scanning driving.

5 Claims, 6 Drawing Sheets

DRIVING CIRCUIT FOR AN ORGANIC ELECTROLUMINESCENT ELEMENT USED IN A DISPLAY

BACKGROUND OF THE INVENTION

1. Field of the Invention

The present invention relates to an emitting element driving circuit for driving an emitting element, and particularly to an emitting element driving circuit for driving an emitting element having a capacitor in parallel to an emission part represented by an electrical equivalent circuit thereof.

2. Description of the Related Art

In the emitting elements, there is an electric field emitting element such as an organic electroluminescent (EL) emitting element. FIG. 6 shows a cross-sectional view of the EL element. This organic EL element consists of a cathode of a metallic electrode 101, an anode of a transparent electrode 102, and an organic fluorescent thin film 103 of an organic compound layer or more and an organic positive-hole transport layer 104 which are layered between the cathode and the anode.

In the organic EL emitting device, a glass substrate 105 is furnished outside the transparent anode 102. A power supply 106 provides electrons and positive-hole to the organic EL emitting device. The recombination of electrons injected from the metal cathode 101 and the holes injected from the transparent anode 102 to the emitting layer 103 generates excitons. The excitons emit light when they are deactivated through radiation. This light radiates toward outside through the transparent anode 102 and the glass substrate 105. An electrical equivalent circuit of this organic EL element has a capacitance because of the lamination structure of electrodes and organic fluorescent substance layers and so on.

FIG. 7 shows the electrical equivalent circuit of the organic EL emitting element where numeral 107 denotes an emission part of constant-voltage element, numeral 108 denotes an internal resistor, and 109 denotes a capacitor. As seen from the figure, the capacitor 109 is connected to the emission part 107 and the internal resistor 108 in parallel.

Assuming that a matrix array of the organic EL emitting elements is driven through the AC driving method with a pulse current in the form of scanning, a voltage-waveform generated from the emitting element will be described.

FIG. 8 shows a voltage-waveform before and after scanning the emitting element through the AC driving method.

The ordinate of FIG. 8 denotes a voltage value across the electrodes of the emitting element and the abscissa denotes time. In FIG. 8, numeral 110 denotes a scanning duration, and numeral 111 denotes a charging duration for the capacitor 109 of the EL element. In addition, VF denotes a forward voltage at a peak emission decided by the static characteristic.

As seen from the figure, the current injected to the emitting element during the scanning is consumed by the electric charging of the capacitor 109 at the beginning, so that the emitting element does not emit light. After the scanning, an inverse voltage is applied across the emitting element to prevent an erroneous emission due to the crosstalk, thereby to extract the electric charge charged in the capacitor 109 during the emission to the outside, so that the charged electric charge does not contribute any emission of the emission part 107. In addition, an instantaneous luminance of the emitting element is proportional to the level of the forward current injected to the emission part 107 thereof. An average luminance of the emitting element during the AC-driving is decided by the product between all of the amount of electric charge injected into the EL element during a period to be measured for the average and the quantum efficiency of the EL element. Therefore, when the quantum efficiency of the EL element is constant, the average luminance of the emitting element is proportional to all of the amount of electric charge injected into the EL element during one scanning of AC current.

FIG. 9 shows a portion of an equivalent circuit of a displaying device comprising organic EL emitting elements. In FIG. 9, numerals 1 denote organic EL emitting elements, therefore, the displaying device is constructed with a matrix arrangement of the number of N x N (only four elements appear in FIG. 9) in which the scanning line consists of the number of N of the EL elements. The cathodes of EL elements are connected at the same time by the switches 114 to power supplies 116 so that voltages are applied thereto, while the anodes are connected by the switches 115 so as to sequentially scan the number of N of the EL element row (vertical) thereby to emit light. In addition, numeral 112 denotes an external resistor used for applying an inverse voltage to the EL elements during the scanning in order to prevent an erroneous emission of the EL elements. The numeral 113 denotes a power supply for the whole driving circuit.

The conventional organic EL emitting element is constructed as mentioned above and used for a displaying device containing the organic EL emitting element.

However, such an emitting element driving circuit with the simple matrix arrangement for the organic EL emitting elements has a problem that the instantaneous emission luminance of each EL element during the scanning increases in proportion to the number of the scanning lines per one scanning in case that a predetermined desired luminance is given through the AC driving method, so that the EL emitting element is deteriorated or broken. In addition, the higher forward voltage increases, the higher the current flowing in the EL element increases in such a driving circuit. As a result, this causes the elevation of the power supply voltage for driving the emitting elements, and thus the number of the scanning lines are limited insufficient to achieve a high resolution for a displayed image.

SUMMARY OF THE INVENTION

Thus, the present invention has been made to solve such a problem in view of the forgoing status. An object of the invention is to provide a driving circuit for driving an emitting element having a capacitor in parallel to an emission part in its electrical equivalent circuit capable of achieving a sufficient luminance even at a constant voltage of the power supply during a high speed scanning driving and to prevent the emitting element from deteriorating or being broken by lowering instantaneous luminance of the emitting element.

The present invention set forth in claim 1 is an emitting element driving circuit for emitting an emitting element comprising a rectifier directly connected in series to the emitting element, per one emitting element.

According to the present invention, the rectifier connected in series to a capacitor, which is connected in parallel to an emission part in the electrical equivalent circuit of the emitting element, prevents from extracting the electric charge charged in the capacitor during the emission scanning to the outside. As a result, the remaining electric charge of the capacitor is used for the next emission scanning, so that the emission efficiency is improved. Therefore, the power supply voltage to be applied to the emitting element for a desired luminance is saved and the deterioration and destruction of the EL element are prevented.

In case that the emitting element driving circuit of the present invention is used in the displaying device with a simple matrix circuit driven with a short scanning period, the elevation of the instantaneous luminance of the EL element is suppressed regardless of the increase of the number of the scanning lines. Therefore, the number of the scanning lines may be increased for achieving a high resolution for a displayed image.

Other and further features, advantages and benefits of the invention will become apparent in the following description taken in conjunction with the following drawings. It is to be understood that the foregoing general description and following detailed description are exemplary and explanatory but are not to be restrictive of the invention. The accompanying drawings which are incorporated in and constitute a part of this invention and, together with the description, serve to explain the principles of the invention in general terms. Like numerals refer to like parts throughout the disclosure.

DETAILED DESCRIPTION OF THE PREFERRED EMBODIMENTS

The embodiments according to the present invention will be described in more detail with reference to the accompanying drawings, particularly FIGS. 1 to 5.

Figure 1:
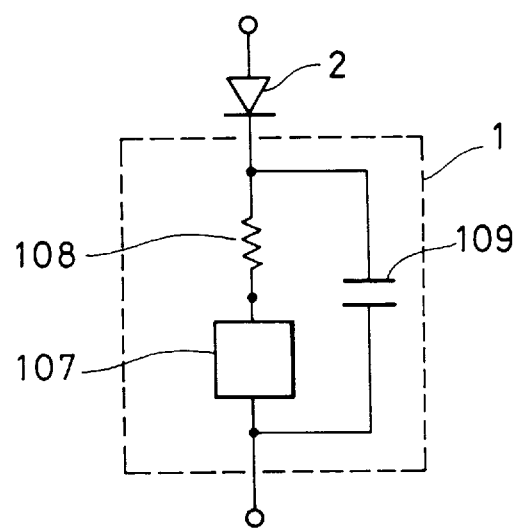
FIG. 1 is an electrical equivalent circuit diagram of the emitting element driving circuit in the present invention.

FIG. 1 shows the electrical equivalent circuit of the organic EL emitting element driven by an emitting element driving circuit according to the present invention, where numeral 1 denotes an emitting element such as an organic EL emitting element, and numeral 107 denotes an emission part of constant-voltage element, and numeral 108 denotes an internal resistor, and numeral 109 denotes a capacitor. As seen from the figure, the capacitor 109 is connected to the emission part 107 and the internal resistor 108 in parallel in the organic EL emitting element. In addition, numeral 2 denotes a rectifier such as a rectification diode or the like which is connected in series to the emitting element 1. Both the emitting element 1 and the rectifier 2 may be included in the emitting element driving circuit.

In case that the emitting element driving circuit with a matrix array of the organic EL emitting elements is driven through the AC driving method with a pulse current in the form of scanning driving, a voltage-waveform generated from the emitting element will be described.

Figure 2:
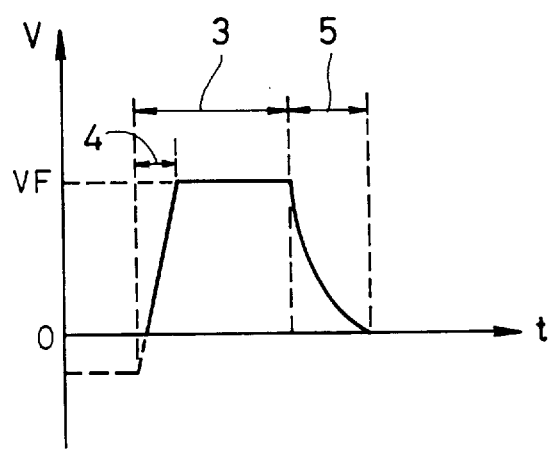
FIG. 2 is a graphical representation showing a voltage-waveform before and after scanning the emitting element through the AC driving method in accordance with the present invention.

FIG. 2 shows a voltage-waveform before and after scanning the emitting element through the AC driving method.

The ordinate of FIG. 2 denotes a voltage value appearing across the electrodes of the emitting element and the abscissa denotes time. In FIG. 2, numeral 3 denotes a scanning duration, and numeral 4 denotes a charging duration for the capacitor 109 of the EL emitting element 1. Numeral 5 denotes a discharging duration for the capacitor 109 of the EL emitting element 1. In addition, VF denotes a forward voltage at a peak emission decided by the static characteristic. As seen from the figure, the applied forward voltage injects the current to the emitting element during the scanning of the emitting element driving circuit. The injected current is consumed by the electric charging of the capacitor 109 at the beginning, so that the emitting element i.e., the emission part does not emit light. Next, upon the lapse of charging duration 4, the emission part 107 starts to emit light at the forward voltage level (VF shown in FIG. 2). After the scanning duration 3, an inverse voltage is applied across the emitting element 1, but the rectifier 2 functioning as a valve prohibits the injection of the inverse current. At this point, the emitting element driving circuit becomes a closed circuit, so that the electric charge remaining in the capacitor 109 flows through the internal resistor 108 into the emission part 107, so that the emission of the emitting element 1 continues during the discharging duration 5. As a result, the average luminance of the EL. element per one scanning increases by the level of the remaining electric charge of the capacitor 109 in comparison with the conventional device at a low speed scanning.

Furthermore, in case that the number of scanning per a unit time in the emitting element driving circuit is increased i.e., the scanning speed is raised up, finally, the next scanning starts before all of the remaining electric charge of the capacitor 109 of the last scanning finishes flowing into the emission part. As a result, the EL element continues to emit light.

Figure 3:
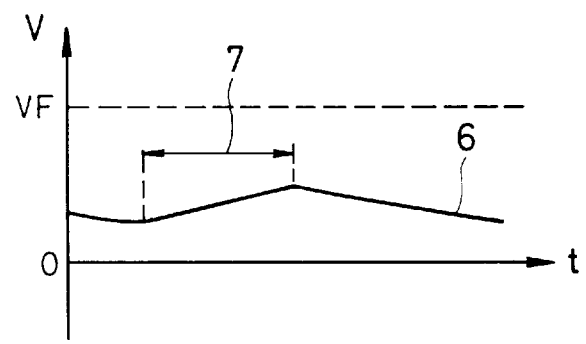
FIG. 3 is a graphical representation showing a voltage-waveform generated across the EL element driven at a high speed by an emitting element driving circuit in accordance with the present invention.

In this case of at a high speed scanning, since the switching interval of the current is shorter than the charging duration of EL element, one part of the current flowing into the EL element is consumed by the electric charging of the capacitor 109. Therefore, the voltage-waveform 6 appearing across the EL element is obtained as shown in FIG. 3 in which the peak of the voltage-waveform 6 does not reach at the forward voltage VF decided by the static characteristic of the EL element.

Figure 4:
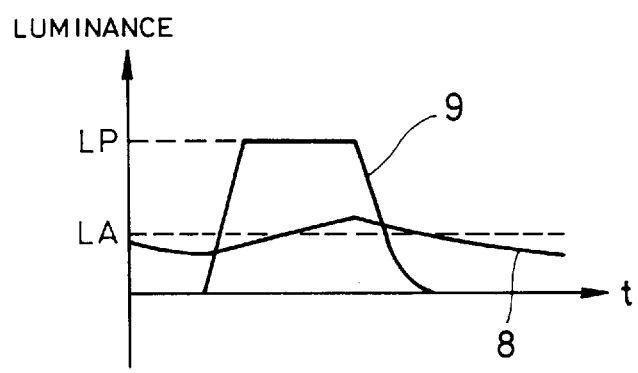
FIG. 4 is a graphical representation showing instantaneous emission luminance characteristics of the EL element driven at high and low speeds by an emitting element driving circuit in accordance with the present invention.

FIG. 4 shows variations of instantaneous emission luminance with respect to time in which the luminance curve 8 is at a high speed scanning of the EL element and the luminance curve 9 is at a low speed scanning of the EL element. The peak of the high speed luminance curve 8 does not reach at the peak level of the high speed instantaneous emission luminance (LP shown in FIG. 4). The average emission luminance of the high speed curve 8 is substantially maintained at a constant regardless of the scanning speed in the conditions that the scanning duty ratio is constant, because the average luminance of the emitting element during the AC-driving is decided by the product between all of the amount of electric charge injected into the EL element during a period to be measured for the average and the quantum efficiency of the EL element.

Figure 5:
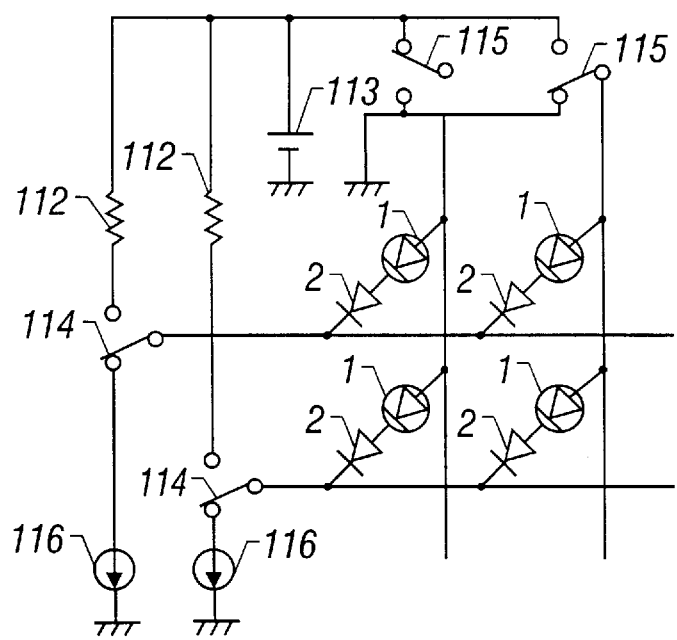
FIG. 5 is an electrical equivalent circuit diagram of the displaying device using the emitting element driving circuit in accordance with the present invention.
Figure 6:
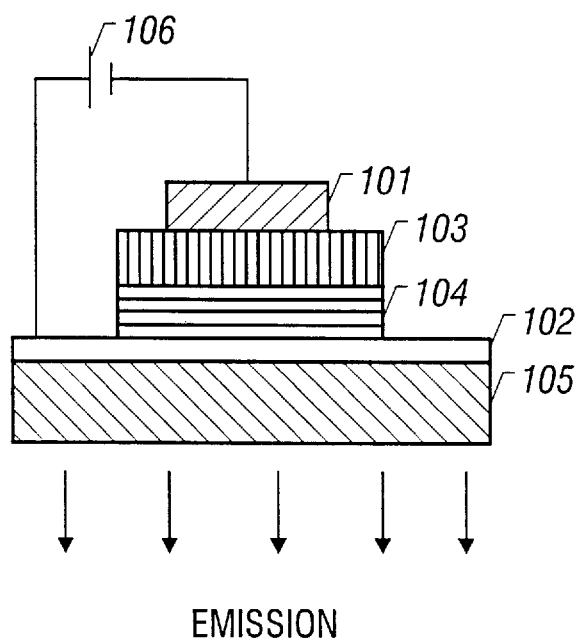
FIG. 6 is a schematic cross sectional view of an organic EL emitting element.
Figure 7:
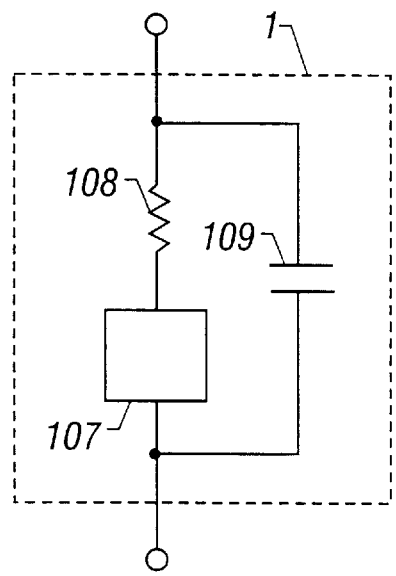
FIG. 7 is an electrical equivalent circuit diagram of an organic EL emitting element driving circuit.
Figure 8:
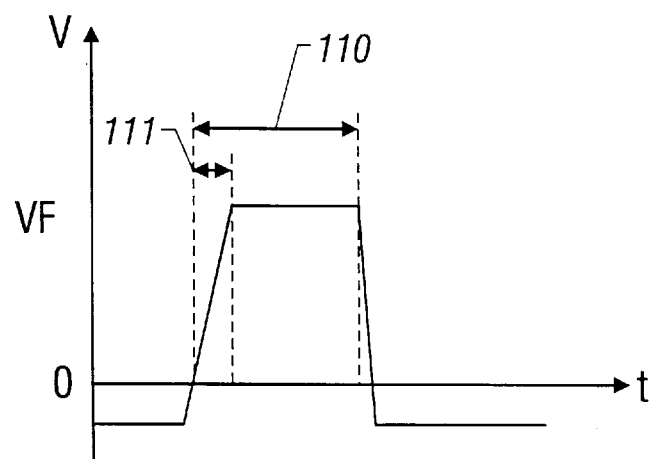
FIG. 8 is a graphical representation showing a voltage-waveform before and after scanning the emitting element through the AC driving method.

Next, an operation of a displaying device comprising organic EL emitting elements according to the present invention will be described with reference to FIG. 5. FIG. 5 shows a portion of an equivalent circuit of the displaying device comprising organic EL emitting elements driven by the emitting element driving circuit according to the present invention. In the figure, numerals 1 denote organic EL emitting elements, and numerals 2 denote rectifiers each is connected in series to each organic EL emitting element. This displaying device is constructed with a simple matrix arrangement of the number of N x N (only four elements appear in FIG. 5) in which the scanning line consists of the number of N of the EL elements. The cathodes of EL elements are connected at the same time by the switches 114 to power supplies 116 so that voltages are applied thereto, while the anodes are connected by the switches 115 so as to sequentially scan the number of N of the EL element row (vertical) thereby to emit light. In addition, numeral 112 denotes an external resistor used for applying an inverse voltage to the EL elements during the scanning in order to prevent an erroneous emission of the EL elements. The numeral 113 denotes a power supply for the whole driving circuit.

Figure 9:
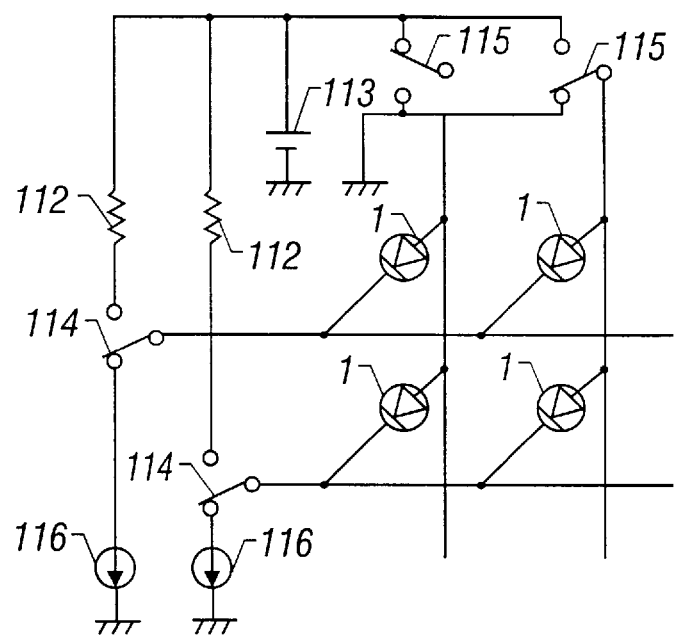
FIG. 9 is an electrical equivalent circuit diagram of the displaying device using the emitting element driving circuit.

The higher scanning speed of the displaying device is raised gradually, finally, the next scanning starts before all of the remaining electric charge of the capacitor 109 of the last scanning finishes flowing into the emission part. As a result, the EL element continues to emit light. Therefore, any electric charge charged in the capacitor of each EL element during the emission is not extracted to the outside. In contrast the remaining electric charge in the capacitor is used for emission of the EL element, so that the emission efficiency is improved. In addition, since the peak luminance of each EL element becomes close to the average luminance, the electric load to the emitting element is reduced, so that the life of the EL element increases greatly. Furthermore, the peak voltage to applied to the EL element is managed to the average voltage required for the average luminance. Therefore, the displaying device comprising organic EL emitting elements according to the present invention can be provided with a low power supply voltage lower than that of sufficient to maintain the average luminance emitted by the conventional organic EL emitting element having the power supply 113 as shown in FIG. 9, i.e., the consumption power is saved and the destruction of the EL element due to overvoltage is prevented.

In addition to the above embodiment in which the emitting element driving circuit drives the organic EL emitting elements, the present invention may be adopted to any emitting element other than the organic EL emitting element in the electrical equivalent circuit such as a light emitting diode, a self-emission type EL element, as far as the emitting element has a capacitor in parallel to an emission part in its electrical equivalent circuit.

According to the present invention set forth in claim 1, the rectifier connected in series to a capacitor in parallel to an emission part in the electrical equivalent circuit of the emitting element prevents extracting the electric charge charged in the capacitor during the scanning to the outside. As a result, the remaining electric charge of the capacitor is used for the next emission scanning, so that the emission efficiency is improved. Therefore, the power supply voltage to be applied to the emitting element for a desired luminance is saved. Therefore, the present invention adapted into the displaying device secures a sufficient emission duration without using a circuit having a memory characteristic such as a thin film transistor (TFT). Moreover, the present invention adapted into the displaying device with a simple matrix construction of emitting elements may easily drive a display panel with a high duty ratio.

Since the peak luminance becomes near the average luminance in the present invention, the power supply voltage for a desired luminance of the emitting element is saved at a low level. Further, the deterioration and destruction of the EL element are prevented.

In the case that the present invention is used for the displaying device with a simple matrix circuit, the increase of the number of the scanning lines does not cause the instantaneous luminance of the EL element rising. Therefore, the number of the scanning lines may be increased to achieve a high resolution for a displayed image.

In addition, when that the present invention is used for the displaying device with a dot matrix circuit, the gray scale representation may be easily achieved by a pulse density moderation or the like because of a short scanning period.

It should thus be apparent that the scope of the teaching of this invention is not intended to be limited by only the embodiments that have been expressly disclosed and illustrated, but that instead the scope of the teaching of this invention should be read as being commensurate with the scope of the claims that follow.

What is claimed is:

1. An emitting element driving circuit for driving an emitting element comprising:
    at least one organic electroluminescent emitting element, and
    a rectifier directly connected in series to said emitting element, wherein said emitting element has a capacitor in parallel to an emission part in its electrical equivalent circuit,
    wherein, immediately after a scanning duration with a forward bias to the emitting element and the rectifier, an inverse voltage is applied across the emitting element, and said rectifier prohibits injection of an inverse current to the emitting element so that emission of the emitting element continues during a discharge period.

2. An emitting element driving circuit according to claim 1 wherein a plurality of the emitting elements are used for a displaying device so as to be constructed with a matrix arrangement array having a number of scanning lines and vertical row lines to form plural crossover points at which the emitting elements are connected to the scanning lines and vertical row lines respectively.

3. An emitting element driving circuit according to claim 2 wherein said matrix arrangement array of the emitting elements is driven through an AC driving method.

4. An emitting element driving circuit according to claim 1 wherein, each of said emitting elements is an organic electroluminescent element comprising a cathode of a metallic electrode, an anode of a transparent electrode, and an organic fluorescent thin film of an organic compound layer and an organic positive-hole transport layer, which are layered between the cathode and the anode, wherein said rectifier is directly connected in series and in a forward direction thereof to said organic electroluminescent element.

5. An emitting element driving circuit for emitting elements with a simple matrix arrangement comprising:

organic electroluminescent emitting element arranged in a simple matrix each having a cathode and an anode and a capacitor in parallel to an emission part in its electrical equivalent circuit;

vertical row lines connected to said emitting elements each connectable to a first power supply for applying a forward voltage thereto;

scanning lines crossing apart from said vertical row lines to form plural crossover points at which the emitting elements are disposed respectively and each connectable to a switch used for applying an inverse voltage to the emitting elements; and at least one rectifier directly connected in series and in a forward direction thereof to each of said emitting elements between respective ones of said vertical row lines and scanning lines, wherein, immediately after a scanning duration with a forward bias to the emitting element and the rectifier, an inverse voltage is applied across the emitting element, and said rectifier prohibits injection of an inverse current to the emitting element so that emission of the emitting element continues during a discharge period.

* * * * *